(12) United States Patent
Ito

(10) Patent No.: US 7,586,562 B2
(45) Date of Patent: Sep. 8, 2009

(54) LIQUID CRYSTAL DISPLAY OF OCB OR VA MODE

(75) Inventor: Yoji Ito, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 683 days.

(21) Appl. No.: 10/536,988

(22) PCT Filed: Dec. 11, 2003

(86) PCT No.: PCT/JP03/15855

§ 371 (c)(1),
(2), (4) Date: May 31, 2005

(87) PCT Pub. No.: WO2004/055584

PCT Pub. Date: Jul. 1, 2004

(65) Prior Publication Data

US 2006/0072054 A1 Apr. 6, 2006

(30) Foreign Application Priority Data

Dec. 13, 2002 (JP) ............................. 2002-362759

(51) Int. Cl.
*G02F 1/1335* (2006.01)
(52) U.S. Cl. ............................. 349/98; 349/96; 349/112
(58) Field of Classification Search .................. 349/98, 349/112
See application file for complete search history.

(56) References Cited

U.S. PATENT DOCUMENTS 6,300,990 B1 10/2001 Yamaguchi et al.

| | | | |
|---|---|---|---|
| 2001/0030726 A1 | 10/2001 | Yoshida et al. | |
| 2002/0015123 A1* | 2/2002 | Iwata et al. | 349/112 |
| 2003/0218709 A1* | 11/2003 | Ito et al. | 349/117 |

FOREIGN PATENT DOCUMENTS

| | | | |
|---|---|---|---|
| JP | 7-325203 A | | 12/1995 |
| JP | 10-020105 A | | 1/1998 |
| JP | 10-161110 A | | 6/1998 |
| JP | 11-231318 A | | 8/1998 |
| JP | 11-160505 A | | 6/1999 |
| JP | 2001-318378 A | | 11/2001 |
| JP | 2002-107750 A | | 4/2002 |
| JP | 2002-182036 A | | 6/2002 |
| JP | 2002-182215 A | | 6/2002 |
| JP | 2002-328228 A | | 11/2002 |
| JP | 2002328228 A | * | 11/2002 |
| WO | WO 0188574 A1 | * | 11/2001 |

* cited by examiner

*Primary Examiner*—Michael H. Caley
(74) *Attorney, Agent, or Firm*—Buchanan Ingersoll & Rooney PC

(57) ABSTRACT

A liquid crystal display of OCB mode or VA mode comprises a backlight unit, a backlight-side polarizing plate, a liquid crystal cell of OCB mode or VA mode, and a viewer-side polarizing plate in order. The viewer-side polarizing plate comprises a first transparent protective film, a polarizing membrane, a second transparent protective film and a light-diffusing layer in order. In the liquid crystal display of OCB mode, an optically anisotropic layer is formed from liquid crystal compound on the first transparent protective film. The first transparent protective film is a cellulose acetate film having a Re retardation value of 20 to 70 nm and a Rth retardation value of 100 to 500 nm. The light-diffusing layer comprises transparent resin and transparent fine particles dispersed therein. The transparent resin and the transparent fine particles have refractive indices that are different from each other.

11 Claims, 2 Drawing Sheets

LIQUID CRYSTAL DISPLAY OF OCB OR VA MODE

FIELD OF INVENTION

The present invention relates to a liquid crystal display of OCB or VA mode using a polarizing plate.

BACKGROUND OF INVENTION

A liquid crystal display comprises a polarizing plate and a liquid crystal cell. Various display modes of the liquid crystal cell have been proposed, for example TN mode and STN mode, which are now popularly used. In a liquid crystal display of TN or STN mode, an optical compensatory sheet is generally provided between the polarizing plate and the liquid crystal cell to improve the viewing angle and qualities of the displayed image.

U.S. Pat. Nos. 4,583,825 and 5,410,422 disclose a liquid crystal display comprising a liquid crystal cell of OCB (Optically Compensatory Bend) mode, in which alignment of rod-like liquid crystal molecules in upper part is essentially reversal (symmetrical) to the alignment of molecules in lower part. Since the liquid crystal molecules are symmetrically aligned in the upper and lower parts, the liquid crystal cell has a self-optical compensatory function. Therefore, this mode is referred to as OCB (optically compensatory bend) mode. In addition to the self-optical compensatory function, the liquid crystal display of OCB mode has another advantage of a rapid response.

Japanese Patent Provisional Publication No. 2(1990)-176625 discloses a liquid crystal display comprising a liquid crystal cell of VA (Vertical Alignment) mode, in which rod-like liquid crystal molecules are essentially vertically aligned while voltage is not applied (while normally black) and the molecules are essentially horizontally aligned while voltage is applied. The liquid crystal display of VA mode has advantages of giving an image with high contrast, responding rapidly and preventing the image from undesired coloring.

As described above, the liquid crystal displays of OCB and VA modes have excellent characters in displaying images, as compared with popularly used displays of TN and STN modes. Nevertheless, in consideration of images given by a CRT display, it is still necessary to improve the displays of OCB and VA modes.

In the displays of OCB and VA modes, as well as in those of TN and STN modes, optical compensatory sheets may be used to improve displayed images.

Japanese Patent Provisional Publication No. 09(1997)-197397 (U.S. Pat. No. 5,805,253) and PCT Publication No. 96/37804 (European Patent Publication No. 0,783,128) disclose a liquid crystal display of OCB mode equipped with an optical compensatory sheet comprising discotic liquid crystal compound. The optical compensatory sheet remarkably improves the viewing angle of the liquid crystal display of OCB mode.

Japanese Patent Provisional Publication No. 2001-027706 discloses a liquid crystal display of VA mode equipped with an optical compensatory sheet comprising discotic liquid crystal compound.

However, though improving image qualities, the optical compensatory sheet provided between the liquid crystal cell and the polarizing plate generally thickens the display. Further, such display is easily distorted by heat to leak light since the compensatory sheet increases elements constituting the display.

Japanese Patent Provisional Publication No. 11(1999) 316378 discloses an elliptically polarizing plate for OCB mode (or for horizontal alignment mode) in which an optical compensatory sheet and a polarizing plate are unified. In detail, the optical compensatory sheet comprises a transparent support and a thereon-provided optically anisotropic layer formed from discotic liquid crystal compound, and works also as a transparent protective film of the polarizing plate. The thus-unified polarizing plate improves displayed images without thickening the display.

However, it is difficult for even the unified polarizing plate to fully prevent large displays of 17-inches or more (which have recently been produced and used) from thermal distortion and accordingly from leaking light.

SUMMARY OF INVENTION

The present inventor has studied and found that the light leakage of a liquid crystal display of OCB or VA mode is caused according to the following two mechanisms.

The first cause is distortion induced by change of external temperature and humidity. When the temperature or humidity changes, a polymer film used in the optical compensatory sheet expands or shrinks. The expansion or shrinkage is limited since the film is fixed, and accordingly the compensatory sheet is distorted to change its optical characters. The other is distortion induced by internal thermal distribution in the optical compensatory sheet. Heat generated by an internal or neighboring heat source such as a backlight unit gives thermal distribution, which thermally distorts the sheet to change its optical characters.

Accordingly, in order to prevent the light leakage, it is desired to make the optical compensatory sheet less change its optical characters.

In the unified polarizing plate or optical compensatory sheet, a cellulose acetate film is usually used. However, it has been found that a polymer having hydroxyl group such as cellulose acetate is greatly affected with environmental conditions to change its optical characters.

The inventor has further studied and finally found that the unified polarizing plate, in which an optical compensatory sheet and a polarizing plate is unified, can be prevented from changing its optical character and accordingly from leaking light by thinning two cellulose acetate films used as protective films provided on both sides of the polarizing membrane.

An object of the present invention is to improve qualities of images given by a liquid crystal display of OCB mode, by means of a polarizing plate comprising in order an optically anisotropic layer formed from liquid crystal compound, a first transparent protective film of cellulose acetate film, a polarizing membrane, a second transparent protective film, and a light-diffusing layer.

Another object of the invention is to improve qualities of images given by a liquid crystal display of VA mode, by means of a polarizing plate comprising in order a first transparent protective film of cellulose acetate film, a polarizing membrane, a second transparent protective film, and a light-diffusing layer.

A further object of the invention is to improve image qualities (particularly, to enlarge the viewing angle) of a liquid crystal display designed to give a wide viewing angle, by means of an optically anisotropic layer made of optically anisotropic cellulose acetate or liquid crystal compound.

A furthermore object of the invention is to provide a liquid crystal display give a wide viewing angle and to prevent the displayed images from lowering contrast, from inverting tone and from changing hue according to the viewing angle, without thickening the display, by means of a polarizing plate having improved durability.

The objects of the invention are achieved by the liquid crystal displays (1) to (33) described below.

(1) A liquid crystal display of OCB mode which comprises a backlight unit, a backlight-side polarizing plate, a liquid crystal cell of OCB mode and a viewer-side polarizing plate in order, wherein the viewer-side polarizing plate comprises an optically anisotropic layer formed from liquid crystal compound, a first transparent protective film of cellulose acetate film, a polarizing membrane, a second transparent protective film and a light-diffusing layer in order, said viewer-side polarizing plate being so placed that the optically anisotropic layer formed from liquid crystal compound is arranged on a side of the liquid crystal cell, wherein the first transparent protective film is a cellulose acetate film having a Re retardation value of 20 to 70 nm and a Rth retardation value of 100 to 500 nm, and wherein the light-diffusing layer comprises transparent resin and transparent fine particles dispersed therein, said transparent resin and said transparent fine particles having refractive indices that are different from each other.

(2) The liquid crystal display of (1), wherein the first transparent protective is a cellulose acetate film having a thickness of 10 to 70 μm.

(3) The liquid crystal display of (1), wherein the first transparent protective film is a cellulose acetate film comprising cellulose acetate having an acetic acid content of 59.0 to 61.5%.

(4) The liquid crystal display of (1), wherein the first transparent protective film is a cellulose acetate film comprising 100 weight parts of cellulose acetate and 0.01 to 20 weight parts of an aromatic compound having at least two aromatic rings.

(5) The liquid crystal display of (1), wherein the second transparent protective film is a cellulose acetate film having a thickness of 10 to 70 μm.

(6) The liquid crystal display of (1), wherein the second transparent protective film is a cellulose acetate film comprising cellulose acetate having an acetic acid content of 59.0 to 61.5%.

(7) The liquid crystal display of (1), wherein the second transparent protective film has, on a side of the light-diffusing layer, a surface on which average surface roughness measured at a cut-off value of 0.8 mm per 100 mm length is 0.2 μm or less.

(8) The liquid crystal display of (1), wherein the liquid crystal compound is a discotic liquid crystal compound.

(9) The liquid crystal display of (1), wherein the difference between the refractive index of the transparent resin and the refractive index of the transparent fine particles is in the range of 0.02 to 0.15.

(10) The liquid crystal display of (1), wherein the transparent fine particles have a size distribution having at least two peaks.

(11) The liquid crystal display of (10), wherein one peak is in the range of 0.5 to 2.0 μm and another peak is in the range of 2.0 to 5.0 μm.

(12) The liquid crystal display of (1), wherein the light-diffusing layer has a haze of 40% or more.

(13) The liquid crystal display of (1), wherein a low-refractive index layer having a refractive index of 1.35 to 1.45 is provided on the light-diffusing layer.

(14) The liquid crystal display of (13), wherein the low-refractive index layer is formed by cross-linking and hardening a composition with heat or ionizing radiation, said composition comprising a fluorine-containing compound and inorganic fine particles.

(15) The liquid crystal display of (13), wherein a surface of the low-refractive index layer shows an integrating spherical average reflection of 2.3% or less in a wavelength range of 450 to 650 nm.

(16) The liquid crystal display of (1), wherein the liquid crystal cell of OCB mode has a color filter, and a distance between the color filter and the light-diffusing layer of the viewer-side polarizing plate is 0.6 mm or less.

(17) The liquid crystal display of (1), wherein the liquid crystal cell of OCB mode comprises a backlight-side substrate, a liquid crystal layer and a viewer-side substrate in order, wherein a color filter is placed between the liquid crystal layer and the viewer-side substrate, and wherein a total thickness of the viewer-side substrate, the optically anisotropic layer of the viewer-side polarizing plate, the first transparent protective film of the viewer-side polarizing plate, the polarizing membrane of the viewer-side polarizing plate and the second transparent protective film of the viewer-side polarizing plate is 0.6 mm or less.

(18) A liquid crystal display of VA mode which comprises a backlight unit, a backlight-side polarizing plate, a liquid crystal cell of VA mode and a viewer-side polarizing plate in order, wherein the viewer-side polarizing plate comprises a first transparent protective film of cellulose acetate film, a polarizing membrane, a second transparent protective film and a light-diffusing layer in order, said viewer-side polarizing plate being so placed that the first transparent protective film is arranged on a side of the liquid crystal cell, wherein the first transparent protective film is a cellulose acetate film having a Re retardation value of 20 to 70 nm and a Rth retardation value of 100 to 500 nm, and wherein the light-diffusing layer comprises transparent resin and transparent fine particles therein-dispersed, said transparent resin and said transparent fine particles having refractive indices that are different from each other.

(19) The liquid crystal display of (18), wherein the first transparent protective film is a cellulose acetate film having a thickness of 10 to 70 μm.

(20) The liquid crystal display of (18), wherein the first transparent protective film is a cellulose acetate film comprising cellulose acetate having an acetic acid content of 59.0 to 61.5%.

(21) The liquid crystal display of (18), wherein the first transparent protective film is a cellulose acetate film comprising 100 weight parts of cellulose acetate and 0.01 to 20 weight parts of an aromatic compound having at least two aromatic rings.

(22) The liquid crystal display of (18), wherein the second transparent protective film is a cellulose acetate film having a thickness of 10 to 70 μm.

(23) The liquid crystal display of (18), wherein the second transparent protective film is a cellulose acetate film comprising cellulose acetate having an acetic acid content of 59.0 to 61.5%.

(24) The liquid crystal display of (18), wherein the second transparent protective film has, on a side of the light-diffusing layer, a surface on which average surface roughness measured at a cut-off value of 0.8 mm per 100 mm length is 0.2 μm or less.

(25) The liquid crystal display of (18), wherein the difference between the refractive index of the transparent resin and the refractive index of the transparent fine particles is in the range of 0.02 to 0.15.

(26) The liquid crystal display of (18), wherein the transparent fine particles have a size distribution having at least two peaks.

(27) The liquid crystal display of (26), wherein one peak is in the range of 0.5 to 2.0 μm and another peak is in the range of 2.0 to 5.0 μm.

(28) The liquid crystal display of (18), wherein the light-diffusing layer has a haze of 40% or more.

(29) The liquid crystal display of (18), wherein a low-refractive index layer having a refractive index of 1.35 to 1.45 is provided on the light-diffusing layer.

(30) The liquid crystal display of (29), wherein the low-refractive index layer is formed by cross-linking and hardening a composition with heat or ionizing radiation, said composition comprising a fluorine-containing compound and inorganic fine particles.

(31) The liquid crystal display of (29), wherein a surface of the low-refractive index layer shows an integrating spherical average reflection of 2.3% or less in a wavelength range of 450 to 650 nm.

(32) The liquid crystal display of (18), wherein the liquid crystal cell of VA mode has a color filter, and a distance between the color filter and the light-diffusing layer of the viewer-side polarizing plate is 0.6 mm or less.

(33) The liquid crystal display of (18), wherein the liquid crystal cell of VA mode comprises a backlight-side substrate, a liquid crystal layer and a viewer-side substrate in order, wherein a color filter is placed between a liquid crystal layer and a viewer-side substrate, and a total thickness of the viewer-side substrate, the first transparent protective film of the viewer-side polarizing plate, the polarizing membrane of the viewer-side polarizing plate and the second transparent protective film of the viewer-side polarizing plate is 0.6 mm or less.

In the present specification, the term "peaks" of the size distribution means local maximums in the size distribution curve, which can be obtained by classifying the particles according to the size (in units of 0.1 μm) and plotting the size on the horizontal axis and the number of particles on the vertical axis.

The retardation value Re is defined by the formula (I), and the retardation value Rth is defined by the formula (II):

$$Re=(nx-ny)\times d \tag{I}$$

$$Rth=\{(nx+ny)/2-nz\}\times d \tag{II}$$

in which nx is a refractive index along the slow axis (the maximum refractive index) in the film plane, ny is a refractive index in the direction perpendicular to the slow axis in the film plane, nz is a refractive index along the depth of the film, and d is the thickness of the film in terms of nm.

DETAILED DESCRIPTION OF INVENTION

Basic Structure of Liquid Crystal Display

Figure 1:
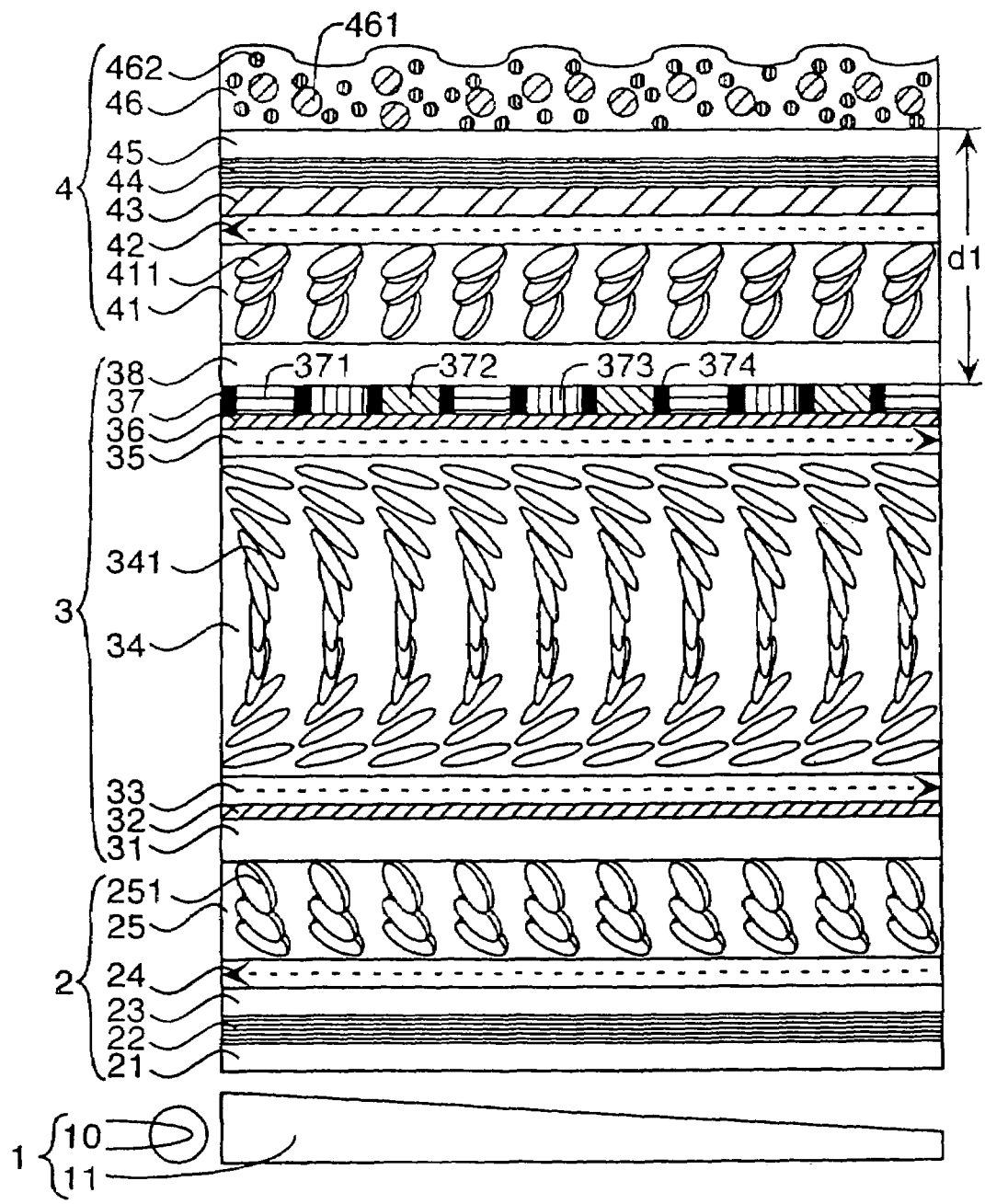
FIG. 1 is a sectional view schematically showing a structure of a liquid crystal display of OCB mode having a polarizing plate.

FIG. 1 is a sectional view schematically showing a structure of a liquid crystal display of OCB mode having a polarizing plate.

The liquid crystal display shown in FIG. 1 comprises a backlight unit (1), a backlight-side polarizing plate (2), a liquid crystal cell of OCB mode (3) and a viewer-side polarizing plate (4).

The backlight unit (1) comprises a light source (11) and a light-guide plate (12). A diffusing plate or a film for increasing brightness may be provided between the backlight unit (1) and the backlight-side polarizing plate (2).

The backlight-side polarizing plate (2) comprises a second transparent protective film (21), a polarizing membrane (22), a first transparent protective film of cellulose acetate film (23), an orientation layer (24) and an optically anisotropic layer (25) formed from liquid crystal compound, layered in this order. The first transparent protective film (23) may have optical anisotropy. In FIG. 1, the arrow in the orientation layer (24) indicates a rubbing direction. In the optically anisotropic layer (25), molecules of the discotic liquid crystal compound (251) are oriented in hybrid alignment, in which the liquid crystal molecules near the orientation layer (24) are aligned at small inclined angles while those far from the orientation layer (24) are at large inclined angles.

The liquid crystal cell of OCB mode (3) comprises a lower glass substrate (31), a lower transparent electro-conductive membrane (32), a lower orientation layer (33), a liquid crystal layer (34), an upper orientation layer (35), an upper transparent electro-conductive membrane (36), a color filter (37) and an upper glass substrate (38), layered in this order. In FIG. 1, the arrows in the orientation layers (33, 35) indicate rubbing directions. In the liquid crystal layer (34), molecules of the rod-like liquid crystal compound (341) are oriented in bend alignment, in which the upper and lower molecules are symmetrically aligned. The color filter (37) comprises blue parts (371), green parts (372), red parts (373) and black matrixes (374) among the parts.

The viewer-side polarizing plate (4) comprises an optically anisotropic layer (41) formed from liquid crystal compound, an orientation layer (42), a first transparent protective film of cellulose acetate film (43), a polarizing membrane (44), a second transparent protective film (45) and a light-diffusing layer (46), layered in this order. In the optically anisotropic layer (41), molecules of the discotic liquid crystal compound (411) are oriented in hybrid alignment, in which the liquid crystal molecules near the orientation layer (42) are aligned at small inclined angles while those far from the orientation layer (42) are at large inclined angles. In FIG. 1, the arrow in the orientation layer (42) indicates a rubbing direction. The first transparent protective film (43) has optical anisotropy, and the second transparent protective film (45) may have optical isotropy. The light-diffusing layer (46) comprises transparent resin, therein-dispersed first transparent fine particles (461) and second ones (462). The first and second transparent fine particles preferably have different refractive indexes and different sizes (namely, the total size distribution curve preferably has two peaks). They may be the same kind of particles (they may have the same refractive index) but have different sizes, or otherwise they may have almost the same sizes (namely, the size distribution curve need not have clearly separated peaks) but have different refractive indexes. It is also possible to use only one kind of particles. On the light-diffusing layer (46), a low-refractive index layer may be provided.

The distance (d1 in FIG. 1) between the color filter (37) and the light-diffusing layer (46) is preferably 0.6 mm or less.

Figure 2:
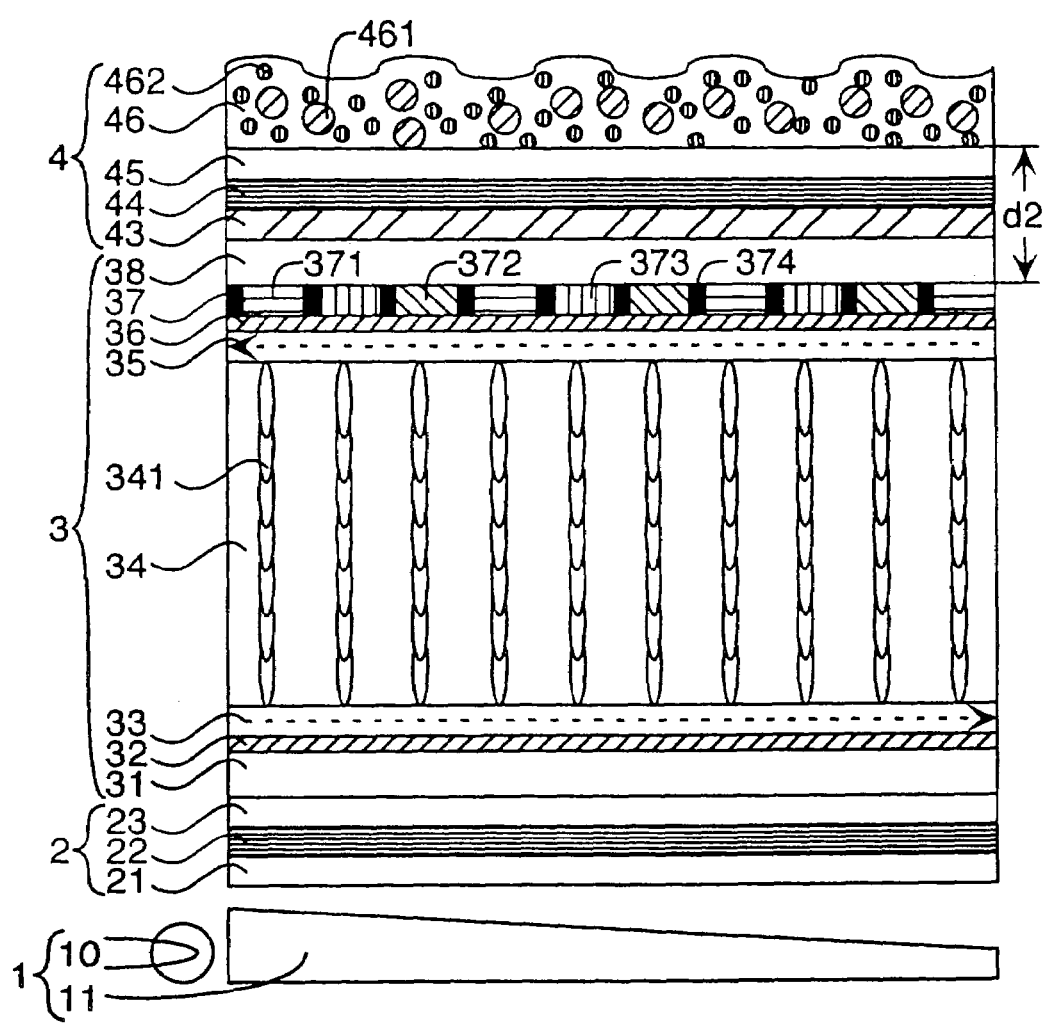
FIG. 2 is a sectional view schematically showing a structure of a liquid crystal display of VA mode having a polarizing plate.

FIG. 2 is a sectional view schematically showing a structure of a liquid crystal display of VA mode having a polarizing plate.

The liquid crystal display shown in FIG. 2 comprises a backlight unit (1), a backlight-side polarizing plate (2), a liquid crystal cell of VA mode (3), and a viewer-side polarizing plate (4).

The backlight unit (1) comprises a light source (11) and a light-guide plate (12). A diffusing plate and/or a film for increasing brightness may be provided between the backlight unit (1) and the backlight-side polarizing plate (2).

The backlight-side polarizing plate (2) comprises a second transparent protective film (21), a polarizing membrane (22), and a first transparent protective film of cellulose acetate film (23), layered in this order. The first transparent protective film (23) may have optical anisotropy.

The liquid crystal cell of VA mode (3) comprises a lower glass substrate (31), a lower transparent electro-conductive membrane (32), a lower orientation layer (33), a liquid crystal layer (34), an upper orientation layer (35), an upper transparent electro-conductive membrane (36), a color filter (37) and an upper glass substrate (38), layered in this order. In FIG. 2, the arrows in the orientation layers (33, 35) indicate rubbing directions. In the liquid crystal layer (34), molecules of the rod-like liquid crystal compound (341) are oriented so that the upper and lower molecules are symmetrically aligned and those at the central part are essentially vertically aligned. The color filter (37) comprises blue parts (371), green parts (372), red parts (373) and black matrixes (374) among the parts.

The viewer-side polarizing plate (4) comprises a first transparent protective film of cellulose acetate film (43), a polarizing membrane (44), a second transparent protective film (45) and a light-diffusing layer (46), layered in this order. The first transparent protective film (43) has optical anisotropy, and the second transparent protective film (45) may have optical isotropy. The light-diffusing layer (46) comprises transparent resin, therein-dispersed first transparent fine particles (461) and second ones (462). The first and second transparent fine particles preferably have different refractive indexes and different sizes (namely, the total size distribution curve preferably has two peaks). They may be the same kind of particles (they may have the same refractive index) but have different sizes, or otherwise they may have almost the same sizes (namely, the size distribution curve need not have clearly separated peaks) but have different refractive indexes. It is also possible to use only one kind of particles. On the light-diffusing layer (46), a low-refractive index layer may be provided.

The distance (d2 in FIG. 2) between the color filter (37) and the light-diffusing layer (46) is preferably 0.6 mm or less.

(Cellulose Acetate Film)

In the present invention, two cellulose acetate films are preferably used as the two (first and second) transparent protective films of the polarizing plate.

The cellulose acetate preferably has an acetic acid content in the range of 59.0 to 61.5%. The term "acetic acid content" means the amount of combined acetic acid per one unit weight of cellulose. The acetic acid content can be determined according to ASTM: D-817-91 (tests of cellulose acetate).

The cellulose acetate has a viscosity average polymerization degree (DP) of preferably 250 or more, more preferably 290 or more.

Further, it is also preferred for the cellulose acetate to have a narrow molecular weight distribution of Mm/Mn (Mm and Mn are weight and number average molecular weights, respectively), which is determined by gel permeation chromatography. The value of Mm/Mn is preferably in the range of 1.00 to 1.70, more preferably in the range of 1.30 to 1.65, most preferably in the range of 1.40 to 1.60.

Generally in preparing cellulose acetate, hydroxyl groups at 2-, 3- and 6-position of cellulose unit are not equally substituted, and the substitution degree at 6-position is apt to be relatively small. In the cellulose acetate used in the invention, however, the substitution degree at 6-position is preferably not smaller than those at 2- and 3-positions.

The hydroxyl group at 6-position is substituted in an amount of preferably 32% or more, more preferably 33% or more, most preferably 34% or more, based on the total substitution degree at 2-, 3- and 6-positions. Further, the substitution degree at 6-position is preferably 0.88 or more.

The cellulose acetate films used in the invention can be made of cellulose acetate prepared according to the methods described in Japanese Patent Provisional Publication No. 11(1999)-5851 (Synthesis examples 1 to 3).

The cellulose acetate film has a thickness of preferably 10 to 70 μm, more preferably 20 to 70 μm, most preferably 20 to 60 μm. The cellulose acetate film has a modulus of elasticity preferably in the range of 3,000 Mpa or less, more preferably in the range of 2,500 Mpa or less. The film also preferably has a moisture-swelling coefficient of $30 \times 10^{-5}/cm^2/\%$ RH or less. The moisture-swelling coefficient is more preferably $15 \times 10^{-5}/cm^2/\%$ RH or less, most preferably $10 \times 10^{-5}/cm^2/\%$ RH or less. The moisture-swelling coefficient indicates how long a film sample expands when the relative humidity increases under a constant temperature. The film is preferably stretched biaxially so that the polymer molecules may be aligned in the plane, and thereby the distortion induced by change of temperature and humidity can be effectively reduced.

The cellulose acetate film has a surface roughness (Ra) of preferably 0.2 μm or less, more preferably 0.16 μm or less, most preferably 0.14 μm or less. It is particularly effective to control the surface roughness (Ra) of the light-diffusing layer-side surface of the second transparent protective film. Generally in preparing a cellulose acetate film, relatively fine wrinkles are apt to be formed laterally. The surface roughness, therefore, is measured along the lateral direction at a random position to estimate roughness per 100 mm. The cut-off value is set at 0.8 mm.

The cellulose acetate film is preferably prepared according to a solvent cast method. In the solvent cast method, a solution (dope) in which cellulose acetate is dissolved in an organic solvent is used.

The organic solvent preferably contains a solvent selected from the group consisting of an ether having 2 to 12 carbon atoms, a ketone having 3 to 12 carbon atoms, an ester having 2 to 12 carbon atoms and a halogenated hydrocarbon having 1 to 6 carbon atoms.

The ether, the ketone or the ester may have a cyclic structure. A compound having two or more functional groups of ether, ketone or ester (—O—, —CO— or —COO—) is also usable as the solvent. The organic solvent may have other functional groups such as alcoholic hydroxyl.

Examples of the ether include diisopropyl ether, dimethoxymethane, dimethoxyethane, 1,4-dioxane, 1,3-dioxolan, tetrahydrofuran, anisole and phenetole.

Examples of the ketone include acetone, methyl ethyl ketone, diethyl ketone, diisobutyl ketone, cyclohexanone and methylcyclohexanone.

Examples of the ester include ethyl formate, propyl formate, pentyl formate, methyl acetate, ethyl acetate and pentyl acetate.

Examples of the compound having two or more functional groups include 2-ethoxyethyl acetate, 2-methoxyethanol and 2-butoxyethanol.

The halogenated hydrocarbon preferably has one or two carbon atoms, more preferably one carbon atom. The halogen is preferably chlorine. The hydrogen in the halogenated hydrocarbon is substituted with halogen in an amount of preferably 25 to 75 mol. %, more preferably 30 to 70 mol. %, further preferably 35 to 65 mol. %, most preferably 40 to 60 mol. %. A typical halogenated hydrocarbon is methylene chloride.

Two or more kinds of the solvents may be mixed to use in combination.

The cellulose acetate solution can be prepared in an ordinary manner. The term "ordinary manner" means that the preparation is carried out at a temperature of 0° C. or more (room temperature or elevated temperature). The cellulose acetate solution (dope) can be prepared through a common process by means of a common apparatus in the normal solvent cast method. In the normal process, a halogenated hydrocarbon (particularly, methylene chloride) is preferably used as the solvent.

The amount of cellulose acetate in the solution is preferably in the range of 10 to 40 wt. %, more preferably in the range of 10 to 30 wt. %. To the organic (main) solvent, additives described after may be optionally added.

Cellulose acetate and the organic solvent are mixed and stirred at room temperature (0 to 40° C.) to prepare the solution. For preparing the solution in high concentration, the preparation may be carried out at an elevated temperature under a high pressure. In that case, the cellulose acetate and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure but so that the solvent may not boil. The temperature is normally in the range of 40° C. or more, preferably in the range of 60 to 200° C., more preferably in the range of 80 to 110° C.

Before placed in the vessel, the components of the solution may be beforehand mixed. They may be also added one by one into the vessel. The vessel must be equipped with a stirring means. Inactive gas such as nitrogen gas may be charged in the vessel to increase the inner pressure. Otherwise, the vessel may be heated to elevate the vapor pressure of the solvent so that the inner pressure may increase. After the vessel is sealed, each component may be added under an elevated pressure.

The vessel is preferably heated from outside. For example, a jacket heater is preferably used. Otherwise, liquid heated with a plate heater placed outside of the vessel may be made to flow through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is provided to scratch and renew liquid attached on the inside wall.

In the vessel, various meters such as pressure gauge and thermometer may be provided. The components are dissolved in the solvent in the vessel. The thus-prepared dope may be cooled and then taken out of the vessel, or may be taken out and then cooled with a heat exchanger.

The solution can be prepared according to the cooling dissolution method, which makes it possible to dissolve cellulose acetate in an organic solvent in which cellulose acetate cannot be dissolved by a conventional process. Further, according to that method, cellulose acetate can be rapidly and homogeneously dissolved in an organic solvent in which cellulose acetate can be dissolved by a conventional process.

First in the process of cooling dissolution method, cellulose acetate is gradually added with stirring into an organic solvent at room temperature.

The amount of cellulose acetate in the mixture is preferably in the range of 10 to 40 wt. %, more preferably in the range of 10 to 30 wt. %. Various additives described after may be added in the mixture.

The prepared mixture is cooled to a temperature of −100 to −10° C. (preferably −80 to −10° C., more preferably −50 to −20° C., most preferably −50 to −30° C.). The cooling procedure can be carried out, for example, with dry ice-methanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C. (preferably 0 to 150° C., more preferably 0 to 120° C., most preferably 0 to 50° C.). Through the warming procedure, cellulose acetate is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the cooling rate is 10,000° C. per second, a technical upper limit is 1,000° C. per second, and a practical upper limit is 100° C. per second. The warming rate means the change of temperature at the warming step per the time taken to complete the warming step. The change of temperature means the difference between the temperature at which the warming step is started and the temperature at which the warming step is completed.

Thus, a homogeneous solution can be prepared. If cellulose acetate is not sufficiently dissolved, the cooling and warming procedures may be repeated. It can be judged by observation with the eyes whether cellulose acetate is sufficiently dissolved or not.

In the process of cooling dissolution method, a sealed vessel is preferably used to prevent contamination of water, which may be caused by dew condensation at the cooling step. Further, the mixture may be cooled under a reduced pressure so that the time taken to complete the cooling step can be shortened, and hence a vessel resisting pressure is preferably used to conduct the procedures under a reduced pressure.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at about 33° C. Below that temperature, the solution is in the form of homogeneous gel. The solution, therefore, must be kept at a temperature above the pseudo-phase transition point, preferably at a temperature higher than the pseudo-gel phase transition point by about 10° C. The pseudo-gel phase transition point depends upon various conditions such as the organic solvent, the acetic acid content, the viscosity average polymerization degree and the concentration of cellulose acetate.

The cellulose acetate film is formed from the prepared cellulose acetate solution (dope) according to the solvent cast method.

The dope is cast on a drum or a band, and the solvent is evaporated to form a film. The solid content of the dope is preferably controlled in the range of 18 to 35%. The surface of the drum or band is preferably beforehand polished to be a mirror. The casting and drying steps of the casting method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The surface temperature of the drum or band is preferably 10° C. or below. After cast on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5(1993)-17844. That procedure can shorten the time taken to complete the steps of cooling to peeling. For performing the procedure, the cast dope must gel at the surface temperature of the drum or band.

Two or more cellulose acetate solutions (dopes) can be cooperatively cast to form two or more layers. For example, two or more outlets are arranged at intervals along the running direction of the support, and from each outlet each cellulose acetate solution is cast to form a layered film (Japanese Patent Provisional Publication Nos. 61(1986)-158414, 1(1989)-122419 and 11(1999)-198285). Otherwise, cellulose acetate solutions may be cast from two outlets to form a film (Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933). Further, a flow of high-viscous cellulose acetate solution may be enclosed with a flow of low-viscous one to form a layered flow, and the high- and low-viscous solutions in the layered flow may be simultaneously extruded to produce a film (Japanese Patent Provisional Publication No. 56(1981)-162617).

Further, Japanese Patent Publication No. 44(1969)-20235 discloses another film preparation. In the disclosed process, a cellulose acetate solution is cast on the support from one outlet to form a film. After peeled from the support, the formed film is turned over and again placed on the support. On the thus appearing surface (having been in contact with the support), another cellulose acetate solution is cast from another outlet to form a film.

The plural cellulose acetate solutions may be the same or different from each other. The function of each cellulose acetate layer can be given by each corresponding solution extruded from each outlet.

Coating solutions for forming other functional layers (e.g., adhesive layer, dye layer, antistatic layer, anti-halation layer, UV absorbing layer, polarizing layer) can be simultaneously extruded with the cellulose acetate solutions.

In a conventional single layer preparation process, it is necessary to extrude a cellulose acetate solution having such high concentration and such high viscosity that the resultant film may have the aimed thickness. In that case, the cellulose acetate solution is often so unstable that solid contents are deposited to cause troubles and to impair a plane surface. To avoid the problem, plural concentrated cellulose acetate solutions are simultaneously extruded from outlets onto the support. The thus-prepared thick film has an excellently plane surface. In addition, since the concentrated solutions are used, the film is so easily dried that the productivity (particularly, production speed) can be improved.

In the cellulose acetate solution, a plasticizer can be added to enhance mechanical strength of the resultant film or to shorten the time for drying. The plasticizer is, for example, a phosphoric ester or a carboxylic ester. Examples of the phosphoric ester include triphenyl phosphate (TPP) and tricresyl phosphate (TCP). Typical examples of the carboxylic ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethyl hexyl phthalate (DEHP). Examples of the citrate esters include triethyl o-acetylcitrate (OACTE) and tributyl o-acetylcitrate (OACTB). Further, butyl oleate, methylacetyl ricinolate, dibutyl sebacate and various trimellitic esters can be used. The plasticizers of phosphate esters (DMP, DEP, DBP, DOP, DPP, DEHP) are preferred. Particularly preferred are DEP and DPP.

The content of the plasticizer is preferably in the range of 0.1 to 25 wt. %, more preferably in the range of 1 to 20 wt. %, and most preferably in the range of 3 to 15 wt. % based on the amount of cellulose ester.

Further, a deterioration inhibitor (e.g., oxidation inhibitor, peroxide decomposer, radical inhibitor, metal inactivating agent, oxygen scavenger, amine) may be incorporated in the cellulose acetate film. The deterioration inhibitor is described in Japanese Patent Provisional Publication Nos. 3(1991)-199201, 5(1993)-1907073, 5(1993)-194789, 5(1993)-271471 and 6(1994)-107854. The content of the deterioration inhibitor is preferably in the range of 0.01 to 1 wt. %, more preferably in the range of 0.01 to 0.2 wt. % based on the amount of the dope. If the content is less than 0.01 wt. %, the deterioration inhibitor gives little effect. If it is more than 1 wt. %, the inhibitor often oozes out (bleeds out) to appear on the surface of the film. Particularly preferred deterioration inhibitors are butylated hydroxytoluene (BHT) and tribenzylamine (TBA).

A cellulose acetate film used as the first transparent protective film has optical anisotropy. As the second protective film, an optically isotropic cellulose acetate film can be used.

Two or more optically anisotropic cellulose acetate films may be used in the liquid crystal display. For example, in addition to the polarizing plate of the invention (viewer-side polarizing plate), an optically anisotropic cellulose acetate film can be used in the backlight-side polarizing plate.

The above "cellulose acetate film used as the first transparent protective film has optical anisotropy" means that the film has Re and Rth retardation values in the ranges of 20 to 70 nm and 100 to 500 nm, respectively.

In the case where two optically anisotropic cellulose acetate films are used in the liquid crystal display, one film preferably has Re and Rth retardation values in the ranges of 20 to 70 nm and 100 to 250 nm, respectively.

On the other hand, in the case where one optically anisotropic cellulose acetate film is used in the display, it preferably has Re and Rth retardation values in the ranges of 40 to 150 nm and 200 to 500 nm, respectively.

The birefringence ($\Delta n$: $nx-ny$) of the cellulose acetate film is preferably in the range of 0.001 to 0.002, and that along the thickness of the film $\{(nx+ny)/2-nz\}$ is preferably in the range of 0.001 to 0.04.

The optically anisotropic cellulose acetate film is prepared while its optically anisotropy is controlled by adding a retardation-increasing agent and/or by adjusting the production conditions (in particular, stretching conditions).

The retardation-increasing agent is preferably an aromatic compound having at least two aromatic rings. The aromatic compound is used in an amount of preferably 0.01 to 20 weight parts, more preferably 0.05 to 15 weight parts, most preferably 0.1 to 10 weight parts, based on 100 weight parts of cellulose acetate. Two or more aromatic compounds may be used in combination.

The aromatic ring in the aromatic compound may be an aromatic hydrocarbon ring or an aromatic heterocyclic ring. The molecular weight of the retardation-increasing agent is preferably in the range of 300 to 800.

The retardation-increasing agents are described in Japanese Patent Provisional Publication Nos. 2000-111914, 2000-275434, 2001-166144 and PCT Publication No. 00/02619.

In the case where the retardation is controlled by stretching, the stretching ratio is preferably in the range of 3 to 100%.

The stretching can be carried out by means of a tenter. In the stretching process, a film formed by casting is peeled and immediately stretched with the tenter so as to control the retardation. In the late stage of stretching, the film is preferably kept near the glass transition temperature and narrowed to be balanced with the peeling speed so that the standard deviation of slow axis angle may be small.

The film may be longitudinally stretched between rolls. In that case, if the distance between the rolls is widened, the standard deviation of slow axis can be reduced.

The cellulose acetate film is preferably subjected to surface treatment. Examples of the surface treatment include corona discharge treatment, glow discharge treatment, flame treatment, acid treatment, alkali treatment, and ultraviolet (UV) treatment.

Further, in place of or in addition to the surface treatment, an undercoating layer (described in Japanese Patent Provisional Publication No. 7(1995)-333433) may be provided.

The surface treatments are carried out preferably at a temperature not higher than Tg (glass transition temperature) of the film to improve the plane surface of the film. That is not higher than 150° C.

The surface energy of the film subjected to the surface treatment is preferably not less than 55 mN/m, more preferably in the range of 60 to 75 mN/m.

The surface energy can be measured by the contact angle method, the wet heating method or the adsorption method. These methods are described in "The basic theory and application of wetting (written in Japanese)", published by Realize Co., Ltd, 1989. The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at the crossing point.

The cellulose acetate film is preferably subjected to the acid or alkali (namely, saponifying) treatment, so as to enhance adhesion to the polarizing plate.

It is particularly preferred to perform the alkali treatment.

As the alkali treatment, the steps of immersing the film surface in an alkaline solution, neutralizing with an acidic solution, washing with water and drying are preferably circularly carried out.

Examples of the alkaline solution include aqueous solutions of KOH and NaOH. The normality of hydroxyl ion is preferably in the range of 0.1 to 3.0 N, more preferably in the range of 0.5 to 2.0 N. The temperature of the solution is preferably in the range of room temperature to 90° C., more preferably in the range of 40 to 70° C.

The alkaline solution may be applied on the film surface in place of immersing in consideration of productivity. In that case, after the alkaline solution is applied to saponify the film surface, the film was washed with water to remove the solution. As the solvent for the coating solution, alcohols (e.g., isopropyl alcohol, n-butanol, methanol, ethanol) are preferred in consideration of wettability. Aids for dissolving alkali (e.g., water, propylene glycol, ethylene glycol) may be added.

The productivity of the polarizing plate is affected by moisture permeability of the cellulose acetate film used as the transparent protective film. The polarizing membrane and the protective film are generally laminated with an aqueous adhesive, which is gradually dried according as a solvent of the adhesive is diffused into the protective film. If the film has high moisture permeability, the solvent is so rapidly dried that the productivity is improved. However, if the permeability is too high, moisture in air comes into the polarizing membrane to impair the polarizability when the liquid crystal display is used under some conditions (e.g., under humid conditions).

The moisture permeability of the cellulose acetate film is in the range of preferably 100 to 1,000 g/m$^2$·24 hrs, more preferably 300 to 700 g/m$^2$·24 hrs.

(Light-Diffusing Layer)

As shown in FIGS. 1 and 2, the light-diffusing layer preferably comprises transparent resin and therein-dispersed two kinds of transparent fine particles. For example, cross-linked polystyrene beads (mean particle size: 3.6 µm, refractive index: 1.61) are used as the first transparent fine particles, and silica fine particles (mean particle size: 1.0 µm, refractive index: 1.51) are as the second ones.

The light-diffusing function of the layer is given by difference of refractive index between the transparent resin and the fine particles. The difference of refractive index is in the range of preferably 0.02 to 0.15, more preferably 0.03 to 0.13, most preferably 0.04 to 0.10.

The first fine particles (relatively large particles) preferably have a size distribution in which the peak (mode) is positioned in the range of 2.5 to 5.0 µm. The second particles (relatively small particles) preferably have a size distribution in which the peak (mode) is in the range of 0.5 to 2.0 µm. A preferred size distribution of the particles can be easily obtained by mixing the two kinds of particles having different mode sizes.

The second transparent fine particles (relatively small particles) contribute to an optimal angular distribution of light scattering. In order to improve the image qualities (to improve downward viewing angle), it is necessary to diffuse incident light in some degree. In fact, the more the light is diffused, the more the viewing angle is improved. However, for making an image seen frontally have enough brightness to ensure preferred image qualities, it is necessary to make the transmittance as high as possible. If the mode of the size distribution is positioned at 0.5 µm or more, the amount of light scattered backward is reduced to keep the brightness. On the other hand, if the mode is at 2.0 µm or less, the light is enough scattered to improve the viewing angle. In the size distribution of the second transparent fine particles, the mode is positioned more preferably in the range of 0.6 to 1.8 μm, most preferably in the range of 0.7 to 1.6 μm.

The first transparent fine particles (relatively large particles) contribute to an optimal surface scattering. For improving the image qualities, it is also important to scatter incident light on the displaying screen surface and thereby to prevent the screen from reflecting surrounding scenes. Therefore, the size distribution of the first fine particles is controlled so that the mode may be positioned in the range of 2.0 to 5.0 μm.

The smaller haze value the surface has, the more the fog of image is reduced and accordingly the clearer image the display gives. However, if the haze value is too low, the screen surface reflects surrounding scenes, and further glittering points (scintillations) are observed on the screen. In contrast, if the haze value is too high, the displayed image is whitened. Accordingly, the haze value on the surface (hs) is preferably in the range of 0.5 to 30, more preferably in the range of 7 to 20, most preferably in the range of 7 to 15.

In order to control the haze value on the surface, the surface of resin layer is preferably roughened adequately by the first transparent fine particles (relatively large particles). The haze value can be determined by means of a measuring apparatus (HR-100, Murakami Shikisai GijutsuKenkyujo Co., Ltd,) according to JIS-K-7105.

If the size of the first particles is 2.0 μm or less, the roughness is so small that the screen surface cannot scatter light enough to prevent the reflection of surrounding scenes. If the size is 5.0 μm or more, the surface has enough roughness to prevent the reflection of surrounding but the displayed image is remarkably whitened to impair the image qualities. Accordingly, in the size distribution of the first transparent fine particles, the mode is positioned preferably in the range of 2.2 to 4.7 μm, more preferably in the range of 2.4 to 4.5 μm.

As described above, with respect to the size of the fine particles, the mode size is more important than the average (mean) size. In the present specification, the term "mode size" means a size to which the largest number of particles belong when the particles are classified according to the size (in terms of 0.1 μm). Hereinafter (also in Examples), the "size" of the fine particles means the mode size.

The surface has an average surface roughness (Ra) of preferably 1.2 μm or less, more preferably 0.8 μm or less, most preferably 0.5 μm or less.

The haze value, particularly the internal haze value (which greatly contributes to diffusion of transmitted light) of the light-diffusing layer closely relates to improvement of the viewing angle.

The light-diffusing layer provided on the viewer-side surface of the polarizing plate diffuses light emitted from the backlight, and thereby the viewing angle characters are improved. If the light is too diffused, the amount of light scattered backward increases and accordingly the brightness of an image seen frontally is lowered. Further, the sharpness of the image is also impaired. In view of that, the internal haze value is in the range of preferably 30 to 80%, more preferably 35 to 70%, most preferably 40 to 60%.

There are some methods for elevating the internal haze value. For example, the content of particles having sizes of 0.5 to 1.5 μm may be increased, or the layer may be thickened. It is also effective to use particles having larger refractive-indexes.

Apart from the internal haze, the surface roughness is preferably controlled to obtain such adequate surface haze that the displayed image can be clearly seen. The internal and surface hazes cooperatively give a total haze value preferably in the range of 40 to 90%, more preferably in the range of 45 to 80%, most preferably in the range of 50 to 70%.

As the transparent fine particles, plastic beads are preferred. The plastic beads are preferably made of material having high transparency, and the difference of refractive index between the material and the transparent resin is preferably in the aforementioned range.

Examples of the material for the beads include acryl-styrene copolymer (refractive index: 1.55), melamine resin (refractive index: 1.57), cross-linked acrylic resin (refractive index: 1.49), polycarbonate (refractive index: 1.57), polystyrene (refractive index: 1.60), cross-linked polystyrene resin (refractive index: 1.61), and polyvinyl chloride (refractive index: 1.60).

As the transparent particles, inorganic fine particles may be used. Examples of the inorganic fine particles include silica beads (refractive index: 1.44) and alumina beads (refractive index: 1.63).

The amount of the transparent fine particles is preferably in the range of 5 to 30 weight parts per 100 weight parts of the transparent resin.

The fine particles are liable to settle down in the resin composition (transparent resin). For preventing that, inorganic filler (e.g., silica) may be added. However, the inorganic filler often impairs the transparency of the layer. Accordingly, in order not to lower the transparency, the inorganic filler consisting of grains having sizes of 0.5 μm or less are preferably used in an amount of less than 0.1 wt. % based on the amount of the transparent resin.

As the transparent resin used in the light-diffusing layer, a resin hardened with ultraviolet ray or electron beam is preferably used. A thermosetting resin is also usable. The resin may contain a thermoplastic resin and a solvent.

The transparent resin has a refractive index of preferably 1.50 to 2.00, more preferably 1.57 to 1.90, most preferably 1.64 to 1.80.

The transparent resin preferably comprises binder of a polymer having a main chain of saturated hydrocarbon or polyether. The main chain is more preferably hydrocarbon, and the polymer is preferably cross-linked. The polymer having the main chain of saturated hydrocarbon is preferably prepared from ethylenically unsaturated monomers through polymerization reaction. For preparing the cross-linked polymer, monomers having two or more ethylenically unsaturated groups are preferably used.

Examples of the monomer having two or more ethylenically unsaturated groups include esters of polyhydric alcohol and (meth)acrylic acid (e.g., ethylene glycol di(meth)acrylate, 1,4-dichlorohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexane-triol trimethacrylate, polyurethane polyacrylate, polyester polyacrylate), vinylbenzene and derivatives thereof (e.g., 1,4-divinylbenzene, 4-vinylbenzoic acid-2-acryloyl ethyl-ester, 1,4-divinylcyclohexanone), vinyl-sulfones (e.g., divinylsulfone), acrylamides (e.g., methylene bisacryl-amide) and methacrylamide. In view of hardness and scratching resistance of the layer, acrylate having five or more functional groups is preferred. A mixture of dipenta-erythritol pentaacrylate and dipenta-erythritol hexa-acrylate is commercially available and particularly preferably used.

These monomers having ethylenically unsaturated groups are dissolved in a solvent together with various polymerization initiators and additives. The thus-prepared solution (coating solution) is applied on a support, dried and polymerized to harden by ionization radiation or heat.

In place of or in addition to the monomers having two or more ethylenically unsaturated groups, cross-linking groups may be introduced into the binder to be cross-linked. Examples of the cross-linking group include isocyanate group, epoxy group, aziridine group, oxazolidine group, aldehyde group, carbonyl group, hydrazine group, carboxyl group, methylol group, and active methylene group. Further, the cross-linked structure can be also obtained by monomers such as vinylsulfonic acid, acid anhydride, cyanoacrylate derivative, melamine, etherized methylol, ester, urethane, and metal alkoxide (e.g., tetramethoxy-silane). Further-more, the binder may be cross-linked by decomposition of some monomers such as block isocyanate group. As the cross-linking group, not only groups that immediately induce cross-linking reaction but also groups that are decomposed to cause the reaction can be used. The binder having the cross-linking group can be applied and cross-linked by heating.

Besides the above polymer, the transparent resin binder can comprise a copolymer of monomers having high refractive indexes and/or superfine particles of metal oxide having a high refractive index.

Examples of the monomers having high refractive indexes include bis(4-methacryloylthiophenyl) sulfide, vinylnaphthalene, vinyl phenyl sulfide, and 4-methacryloxyphenyl 4'-methoxyphenyl thioether.

The size of the superfine particles is preferably 100 nm or less, more preferably 50 nm or less. The metal oxide having a high refractive index is preferably an oxide of at least one metal selected from the group consisting of zirconium, titanium, aluminum, indium, zinc, tin and antimony. Examples of the metal oxide include $ZrO_2$, $TiO_2$, $Al_2O_3$, $In_2O_3$, $ZnO$, $SnO_2$, $Sb_2O_3$ and ITO. Among then, $ZrO_2$ is particularly preferred. The amount of the superfine particles is preferably in the range of 10 to 90 wt. %, more preferably in the range of 20 to 80 wt. % based on the total weight of the transparent resin.

The light-diffusing layer is preferably formed on the cellulose acetate film through a coating process. Normally, a coating solution is directly applied on the second transparent protective film of cellulose acetate to form the diffusing layer. Otherwise, the layer is beforehand formed on another cellulose acetate film, which is then laminated on the second protective film.

In the case where the light-diffusing layer is formed on the cellulose acetate film, it is particularly preferred to use a mixed solvent in the coating solution. The mixed solvent preferably comprises a solvent dissolving cellulose acetate and another solvent not dissolving the cellulose acetate. Preferably, the solvent (or at least one of the solvents) not dissolving the cellulose acetate has a higher boiling point than that (or at least one of those) dissolving the cellulose acetate. The boiling point of the not-dissolving solvent (the highest boiling point if two or more not-dissolving solvents are contained) is higher than that of the dissolving solvent (than the lowest boiling point if two or more dissolving solvents are contained) preferably by 30° C. or more, most preferably by 50° C. or more.

Examples of the solvent dissolving the cellulose acetate include ethers having 2 to 12 carbon atoms (e.g., dibutyl ether, dimethoxy methane, dimethoxy ethane, diethoxy ethane, propylene oxide, 1,4-dioxane, 1,3-dioxolane, 1,3,5-trioxane, teterahydrofuran, anisole, phenetole), ketones having 3 to 12 carbon atoms (e.g., acetone, methyl ethyl ketone, diethyl ketone, dipropyl ketone, diisobutyl ketone, cyclopentanone, cyclohexanone, methyl cyclohexanone), esters having 1 to 12 carbon atoms (e.g., ethyl formate, propyl formate, n-pentyl formate, methyl acetate, ethyl acetate, methyl propionate, ethyl propionate, n-pentyl acetate, γ-butyrolactone), organic solvents having two or more kinds of functional groups (e.g., methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate). Two or more solvents can be used in combination.

Examples of the solvent not dissolving the cellulose acetate include alcohols (e.g., methanol, ethanol, 1-propanol, 2-propanol, 1-butanol, 2-butanol, tert-butanol, 1-pentanol, 2-methyl-2-butanol, cyclohexanol), esters (e.g., isobutyl acetate), and ketones (e.g., methyl isobutyl ketone, 2-octanone, 2-pentanone, 2-hexanone, 2-heptanone, 3-pentanone, 3-heptanone and 4-heptanone). Two or more solvents can be used in combination.

The weigh ratio (A/B) of the total amount of the solvent(s) dissolving the cellulose acetate (A) per that of the solvent(s) not dissolving (B) is preferably in the range of 5/95 to 50/50, more preferably in the range of 10/90 to 40/60, most preferably in the range of 15/85 to 30/70.

In forming the light-diffusing layer, the coating solution is applied and hardened by irradiation of electron beams or ultraviolet rays.

In the irradiation of electron beams, electron beams emitted from an electron accelerator can be used. The electron beams have energy in the range of 50 to 1,000 KeV, preferably in the range of 100 to 300 KeV. Examples of the electron accelerator include Cockcroft-Walton accelerator, Van de Graaff accelerator, resonant transforming accelerator, insulating core-transforming accelerator, linear accelerator, dinamitron, and radio-frequency accelerator. In the irradiation of ultraviolet rays, various light sources such as extra high pressure mercury lamp, high pressure mercury lamp, low pressure mercury lamp, carbon arc lamp, xenon arc lamp and metal halide arc lamp can be used.

The thickness of the light-diffusing layer is in the range of preferably 0.5 to 50 μm, more preferably 1 to 20 μm, further preferably 2 to 10 μm, most preferably 3 to 7 μm.

(Low Refractive Index Layer)

A low refractive index layer can be provided on the light-diffusing layer as the top surface layer, to give anti-reflection function to the polarizing plate.

The low refractive index layer has a refractive index in the range of 1.35 to 1.45.

The refractive index of the low refractive index layer preferably satisfies the following formula:

$$(m\lambda/4) \times 0.7 < n_1 \times d_1 < (m\lambda/4) \times 1.3$$

in which m is a positive odd number (usually 1), $n_1$ is the refractive index of the low refractive index layer, $d_1$ is the thickness (nm) of the low refractive index layer, and λ is a wavelength of visible light in the region of 450 to 650 nm.

When the refractive index ($n_1$) satisfies the above formula, a certain positive odd number (m) (which is usually 1) satisfying the formula can be found in the above wavelength region.

The low refractive index layer is preferably made of a fluorine-containing resin. In detail, it can be prepared by hardening a thermosetting or ionization radiation-setting cross-linkable fluorine-containing compound. The hardened fluorine-containing resin has a coefficient of kinetic friction preferably in the range of 0.03 to 0.15, and gives a contact angle with water preferably in the range of 90° to 120°.

Examples of the cross-linkable fluorine-containing compound include a perfluoroalkyl-containing silane compound (e.g., (heptadecafluoro-1,1,2,2-tetradecyl)triethoxysilane) and a fluorine-containing copolymer derived from fluorine-containing monomers and monomers introducing cross-linking groups.

Examples of the fluorine-containing monomers include fluoroolefins (e.g., fluoroethylene, vinylidene fluoride, tetrafluoroethylene, hexafluoroethylene, hexafluoropropylene, perfluoro-2,2-dimethyl-1,3-dioxole), partially or completely fluorinated (meth)acrylic alkyl ester derivatives (e.g., Biscoat 6FM [trade name, Osaka Organic Chemicals Co., Ltd.], M-2020 [trade name, Daikin Co., Ltd.], and partially or completely fluorinated vinyl ethers.

Examples of the monomers introducing cross-linking groups include a (meth)acrylate monomer having a cross-linking group (e.g., glycidyl methacrylate), and a (meth)acrylate monomer having carboxyl, hydroxyl, amino or sulfonic acid group (e.g., (meth)acrylic acid, methylol (meth)acrylate, hydroxyalkyl (meth)acrylate, allylic acrylate). After the (meth)acrylate monomers having carboxyl, hydroxyl, amino or sulfonic acid group are copolymerized, cross-linked structure can be formed in the manner described in Japanese Patent Provisional Publication Nos. 10(1998)-25388 and 10(1998)-147739.

As well as the copolymer derived from fluorine-containing monomers and monomers introducing cross-linking groups, a copolymer derived from these monomers and other monomers can be also used.

The usable monomers other than the above monomers are not particularly restricted. Examples of them include olefins (e.g., ethylene, propylene, isoprene, vinyl chloride, vinylidene chloride), acrylate esters (e.g., methyl acrylate, ethyl acrylate, 2-ethylhexyl acrylate), methacrylate esters (e.g., methyl methacrylate, ethyl methacrylate, butyl methacrylate, ethylene glycol dimethacrylate), styrene and derivatives thereof (e.g., divinylbenzene, vinyltoluene, α-methylstyrene), vinyl ethers (e.g., methylvinyl ether), vinyl esters (e.g., vinyl acetate, vinyl propionate, vinyl cinnamate), acrylamide derivatives (e.g., N-tert-butylacrylamide, N-cyclohexyl-acrylamide), methacrylamide derivatives and acrylonitrile derivatives.

In the fluorine-containing resin, superfine particles of silicon oxide are preferably dispersed to make the layer tough against scratching. The mean size of the particles is preferably 0.1 μm or less, more preferably in the range of 0.001 to 0.05 μm.

As the superfine particles of silicon oxide, commercially available silica sol can be directly added to a coating solution for forming the low refractive index layer. Otherwise, various commercially available silica powders may be dispersed in an organic solvent to prepare a silicon oxide dispersion to be added into the coating solution.

(Optically Anisotropic Layer Formed from Liquid Crystal Compound)

The polarizing plate for OCB mode comprises an optically anisotropic layer formed from liquid crystal compound.

The liquid crystal compounds include rod-like liquid crystal compounds and discotic ones. The compound may be a polymer liquid crystal compound. Further, a polymer in which liquid crystal molecules of low molecular weight are polymerized or cross-linked and thereby which no longer behaves as liquid crystal is also usable.

Examples of the rod-like liquid crystal compound include azomethines, azoxys, cyanobiphenyls, cyanophenyl esters, benzoic esters, cyclohexanecarboxylate phenyl esters, cyanophenylcyclohexanes, cyano-substituted phenylpyrimidines, alkoxy-substituted phenylpyrimidines, phenyldioxanes, tolanes, and alkenylcyclohexylbenzonitriles. Metal complexes are also included in the rod-like liquid crystal compounds. Further, a liquid crystal polymer in which the repeating unit comprises a rod-like liquid crystal moiety is also usable as the rod-like liquid crystal compound. In other words, the rod-like liquid crystal compound may be combined with a (liquid crystal) polymer.

Descriptions of the rod-like liquid crystal compounds are found in "Kagaku-Sosetsu, Ekisho no Kageku" (written in Japanese), vol. 22(1994), Chapters 4, 7 and 11; "Ekisho Devise Handbook" (written in Japanese), chapter 3; and Japanese Patent publication No. 2000-304932.

It is particularly preferred to use discotic liquid crystal compounds.

Examples of the discotic liquid crystal compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp. 2655, (1994). The above discotic compound generally has a structure in which the discotic structure unit is located at the center as a parent core and further straight chain groups such as alkyl, alkoxy and substituted benzoyloxy groups are radially substituted. As the discotic liquid crystal compounds, however, any compound can be used so long as it has negative uniaxial property and orientation property.

The resultant optically anisotropic layer formed from the discotic liquid crystal compound does not need to contain the molecules of the liquid crystal compound. For example, some low molecular weight-discotic liquid crystal compounds having reactive groups are polymerized or cross-linked by heat or light to form polymers that no longer behave as liquid crystal. Such polymers can be also used in the invention. Preferred examples of the discotic liquid crystal compound are described in Japanese Patent Provisional Publication No. 8(1996)-50206.

The optically anisotropic layer is preferably formed from the discotic liquid crystal compound. Molecules of the discotic liquid crystal compound preferably have discotic planes inclined from a plane of the cellulose acetate film at angles varying according to the direction of depth of the layer (namely, the molecules are preferably oriented in hybrid alignment).

The above-described angle (inclined angle) of the discotic plane generally increases or decreases with increase of distance in the direction of depth from the bottom of the optically anisotropic layer (namely, from the surface of the cellulose acetate film). The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The inclined angle preferably totally increases or decreases in the layer, even if it does not vary in the course. The inclined angle more preferably increases totally, and it is particularly preferred to increase continuously.

The optically anisotropic layer can be generally prepared by the steps of: coating an orientation layer with a solution of the discotic liquid crystal compound and additives (e.g., polymerizable monomer, photo-polymerization initiator) dissolved in a solvent, drying, heating to a temperature for forming a discotic nematic phase, and cooling with the oriented condition (discotic nematic phase) kept. The orientation is preferably fixed by polymerization (e.g., by radiation of UV light). The transition temperature from discotic nematic phase to solid phase is preferably in the range of 70 to 300° C., especially 70 to 170° C.

The inclined angle of the discotic plane on the cellulose acetate film side can be generally controlled by selecting the discotic compound or materials of the orientation layer, or by selecting methods for the rubbing treatment. On the other hand, for controlling the inclined angle of the discotic plane on the surface side (air side), the discotic compound or additives (e.g., plasticizer, surface-active agent, polymerizable monomer or polymer) used together with the discotic compound are properly selected. Further, the extent of variation of the inclined angle can be also controlled by the above selections.

The additives such as the plasticizer, the surface-active agent and the polymerizable monomer are preferably compatible with the discotic compound. They may give variation of the inclined angle, but preferably do not inhibit the discotic compound molecules from aligning.

Examples of the polymerizable monomer include compounds having vinyl, vinyloxy, acryloyl or methacryloyl groups. The polymerizable monomer is preferably an acrylate having plural functional groups. The number of the functional groups is preferably three or more, more preferably four or more, most preferably six. A particularly preferred example of the acrylate having six functional groups is dipentaerythritol hexaacrylate. Two or more kinds of monomers having different numbers of functional groups can be mixed to use in combination.

The polymerizable monomer is preferably used in the amount of 1 to 50 wt. %, especially 5 to 30 wt. % based on the amount of the discotic compound.

The optically anisotropic layer may contain a polymer, which is preferably compatible with the discotic compound and which also preferably do not inhibit the discotic liquid crystal molecules from aligning. The polymer may give variation of the inclined angle. As the polymer, cellulose esters (e.g., cellulose acetate, cellulose acetatepropionate, hydroxypropylcellulose and cellulose acetatebutylate) are preferably used. The polymer is used in an amount of preferably 0.1 to 10 wt. %, more preferably 0.1 to 8.0 wt. %, most preferably 0.1 to 5.0 wt. % based on the amount of the discotic compound.

(Orientation Layer)

The molecules of the liquid crystal compound are aligned with an orientation layer.

The orientation layer is preferably a cross-linked polymer membrane subjected to the rubbing treatment. More preferably, the orientation layer is made of cross-linked two polymers. As the polymers, not only polymers originally cross-linkable but also ones cross-linked with cross-linking agents can be used.

The polymers having functional groups can be cross-linked by light, heat or pH variation to form the orientation layer. Otherwise, highly reactive cross-linking agents may be used to introduce linking groups into the polymers, so as to form the orientation layer.

For cross-linking the polymer, a coating solution containing the cross-linkable polymer and, if needed, the cross-linking agent is applied on the cellulose acetate film, and then the cross-linking reaction is induced by light, heat or pH variation. However, as long as the resultant liquid crystal display has enough durability, the reaction may be caused at any stage from the step of coating the film with the orientation layer to the final step of producing the resultant display.

In consideration of orientation of the liquid crystal molecules in the optically anisotropic layer on the orientation layer, the cross-linking reaction is preferably caused after the liquid crystal molecules are aligned. In the case where the coating solution containing the polymer and the cross-linking agent is applied and heated to dry on the cellulose acetate film to form the orientation layer, the cross-linking reaction generally proceeds while the solution is heated and dried. (If the heating temperature is low, the reaction further proceeds when the liquid crystal compound is heated to the temperature for forming liquid crystal phase to form the optically anisotropic layer.) After the applied and dried layer is subjected to the rubbing treatment to form an orientation layer, another coating solution containing the liquid crystal compound is applied and heated above the temperature for forming the liquid crystal phase. The heated solution on the orientation layer is cooled to prepare the optically anisotropic layer.

Examples of the polymers used for the orientation layer include polymethyl metacrylate, polyacrylic acid, polymethacrylic acid, polystyrene, polymaleinimide, gelatin, polyvinyl alcohol, denatured polyvinyl alcohol, poly(N-methylolacrylamide), polyvinyltoluene, chlorosulfonated polyethylene, nitrocellulose, polyvinyl chloride, chlorinated polyolefin, polyester (e.g., polycarbonate), polyimide, polyvinyl acetate, carboxymethylcellulose, polyethylene, and polypropylene. Copolymers thereof are also usable. Examples of the copolymers include acrylic acid/methacrylic acid copolymer, styrene/maleinimide copolymer, styrene/vinyltoluene copolymer, vinyl acetate/vinyl chloride copolymer, and ethylene/vinyl acetate copolymer. Silane coupling agents may be used. Preferred examples are water-soluble polymers such as poly(N-methylolacrylamide), carboxymethylcellulose, gelatin, polyvinyl alcohol and denatured polyvinyl alcohol. Gelatin, polyvinyl alcohol and denatured polyvinyl alcohol are more preferred, and polyvinyl alcohol and denatured polyvinyl alcohol are particularly preferred.

It is most preferred to use two kinds of polyvinyl alcohols or denatured polyvinyl alcohols having different polymerization degrees.

The saponification degree of the polyvinyl alcohol is in the range of preferably 70 to 100%, more preferably 80 to 100%, more preferably 85 to 95%. The polymerization degree is preferably in the range of 100 to 3,000. Examples of the denatured polyvinyl alcohol include polyvinyl alcohols denatured by copolymerization (introduced denaturing group: COONa, $Si(OX)_3$, $N(CH_3)_3.Cl$, $C_9H_{19}COO$, $SO_3Na$, $C_{12}H_{25}$, etc.), by chain transfer (introduced denaturing group: COONa, SH, $C_{12}H_{25}$, etc.) and by block polymerization (introduced denaturing group: COOH, $CONH_2$, COOR, $C_6H_5$, etc.).

With respect to the denatured polyvinyl alcohols, Japanese Patent Provisional Publication No. 8(1996)-338913 describes in detail their syntheses, measurement of visible absorption spectra and methods for determining the ratios of introduced denaturing groups.

Non- or alkylthio-denatured polyvinyl alcohols having saponification degrees of 85 to 95% are particularly preferred.

Examples of the cross-linking agent include aldehydes (e.g., formaldehyde, glyoxal, glutaraldehyde), N-methylol compounds (e.g., dimethylol urea, methyloldimethylhydantoin), dioxane derivatives (e.g., 2,3-dihydroxy-dioxane), compounds that works when the carboxylic group is activated (e.g., carbenium, 2-naphthalenesulfonate, 1,1-bispyrrolidino-1-chloropyridinium, 1-morpholinocarbonyl-3-(sulfonatoaminomethyl)), active vinyl compounds (e.g., 1,3,5-triacryloyl-hexahydro-s-triazine, bis-(vinylsulfone)methane, N,N'-methylenebis-[β-(vinylsulfonyl)propionamide], active halogen compounds (e.g., 2,4-dichloro-6-hydroxy-s-triazine), isooxazoles and dialdehyde starch. Two or more cross-linking agents may be used in combination. In consideration of productivity, reactive aldehydes are preferred. Particularly preferred is glutaraldehyde.

The amount of the cross-linking agent is in the range of preferably less than 50 wt. %, more preferably 0.1 to 20 wt. %, most preferably 0.5 to 15 wt. % based on the amount of the polymer. The amount of non-reacted cross-linking agent remaining in the orientation layer is preferably not more than 1.0 wt. %, more preferably not more than 0.5 wt. % based on the amount of the orientation layer.

The orientation layer can be formed by the steps of applying a coating liquid containing the polymer (and the cross-linking agent) onto the cellulose acetate film, heating to dry (and to cross-link), and subjecting to the rubbing treatment. The coating liquid is preferably prepared from a mixed solvent of water and an organic solvent having defoaming character (e.g., methanol). In the mixed solvent, water is contained in an amount of preferably 1 wt. % or more, more preferably 9 wt. % or more.

The pH value of the coating liquid is preferably adjusted at an optimal value according to the used cross-linking agent. If glutaraldehyde is used as the cross-linking agent, the pH is preferably in the range of 4.5 to 5.5, more preferably at 5.0.

As the coating method, known methods such as spin-coating, dip-coating, curtain-coating, extrusion-coating, bar-coating and E-type coating can be adopted. The E-type coating method is particularly preferred.

The thickness of the layer is preferably in the range of 0.1 to 10 μm. The applied layer is dried at a temperature of preferably 20 to 110° C., more preferably 60 to 100° C., most preferably 80 to 100° C. The time for drying is in the range of preferably 1 minute to 36 hours, more preferably 5 minutes to 30 minutes.

After the polymer layer is cross-linked, the surface of the layer is subjected to rubbing treatment. The rubbing treatment can be conducted in the manner adopted widely in aligning liquid crystal molecules of conventional liquid crystal displays. The surface of the layer is rubbed with paper, cloth (gauze, felt, nylon, polyester) or rubber along a certain direction, to give the aligning function. Generally, the layer is rubbed several times with cloth on which fibers having the same length and thickness are provided.

(Polarizing Membrane)

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films.

The polarizing membrane and the cellulose acetate film are placed so that the slow axes of the film may be essentially parallel to the transmission axis of the membrane.

(Liquid Crystal Display)

The polarizing plate is advantageously used in a liquid crystal display of OCB mode or VA mode.

The liquid crystal display of OCB or VA mode comprises two polarizing plates and a liquid crystal cell provided between them. The liquid crystal cell comprises a pair of electrode substrates and liquid crystal placed between them. The polarizing plate of the invention is used as that provided on the viewer side (displaying screen side). The polarizing plate is placed so that its light-diffusing layer may be on the displaying screen side.

In the liquid crystal cell of OCB (bend alignment) mode, rod-like liquid crystal molecules in upper part and ones in lower part are essentially reversely (symmetrically) aligned. Because of the symmetrical alignment of the liquid crystal molecules, the liquid crystal cell of OCB mode has self-optical compensatory function. A liquid crystal display having the liquid crystal cell of OCB mode is disclosed in U.S. Pat. Nos. 4,583,825 and 5,410,422. The liquid crystal display of OCB mode has an advantage of responding rapidly.

In the liquid crystal cell of VA mode, rod-like liquid crystal molecules are essentially vertically aligned while voltage is not applied.

The liquid crystal cell of VA mode include some types:

(1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied;

(2) a liquid crystal cell of MVA mode (described in SID97, Digest of tech. Papers, 28(1997), 845), in which the VA mode is modified to be multi-domain type so as to enlarge the viewing angle;

(3) a liquid crystal cell of n-ASM mode (described in Nippon Ekisho Toronkai [Liquid crystal forum of Japan], Digest of tech. Papers (1998), 58-59), in which rod-like liquid crystal molecules are essentially vertically aligned while voltage is not applied, and the molecules are essentially oriented in twisted multi-domain alignment while voltage is applied; and (4) a liquid crystal cell of SURVAIVAL mode (published in LCD international 98).

The polarizing plate of the invention is particularly effective when used in a liquid crystal display that can give color images. The liquid crystal display giving color images comprises a liquid crystal cell equipped with a col- or filter. The color filter is generally provided on the viewer-side glass plate of the liquid crystal cell.

On the displaying screen-side of the liquid crystal cell, the color filter is provided in the form of a matrix or dotted pattern. The color filter may have such uneven thickness that the thickness at each color part is differently designed so as to obtain a preferred contrast ratio (ref. Japanese Patent Provisional Publication No. 60(1985)-159823), because the contrast ratio (ratio of brightness) of images given by the liquid crystal display depends on the wavelength of transmitted light and on the thickness of liquid crystal layer.

A transparent electrode for driving the liquid crystal can be provided on the color filter. It is also preferred to provide a black light-absorbing area (black matrix) among the color parts. In the case where a switching device of thin-film transistor is provided on the counter electrode side, the black matrix may be provided to cover the device.

The black matrix can be made of metal (e.g., chromium) or metal compound (e.g., chromium oxide, chromium nitride). The black matrix may consist of plural layers. The thickness of the black matrix is so controlled that the transmittance [$\log_{10}$ (amount of incident light/amount of transmitted light)] may be in the range of 2 to 3. In general, the black matrix preferably has a thickness of 0.06 to 0.2 μm. The black matrix can be formed according to photo-etching method or liftoff method.

In providing the color filter, green parts (whose unevenness is easily recognized by the eyes) are preferably formed first.

Each color part in the color filter is formed from a polymer matrix containing dye or pigment (preferably, dye). The polymer matrix can be prepared from a light-sensitive resin comprising an aqueous solution of protein (e.g., casein, glue, gelatin) and therein-added potassium dichromate or ammonium dichromate. The light-sensitive resin may comprise an acrylate resin and a photo-cross-linking agent. For example, the light-sensitive resin is applied by means of a whirler to form a coating layer having a predetermined thickness. The coating layer is exposed to light through a mask, and developed to form a desired relief image, which is then colored with an aqueous dye acidified by acetic acid.

For preparing the color filter, commercially available dyes can be used. Examples of the red dyes include Lanasn Red S-2GL (Sandoz Ltd.), Irganol Red VL (Ciba-Geigy), Kayanol Milling Red RS and Kayakalan Scarlet GL (Nippon Kayaku Co., Ltd.), and Suminol Level Vinol 3GP (Sumitomo Chemical Co., Ltd.). Examples of the green dyes include Diamilla Brilliant Green 6B (Mitsubishi Chemical Industries, Ltd.), Iliganol Yellow 4GLS (Ciba-Geigy), Sumifix Starx Blue BS 100% (Sumitomo Chemical Co., Ltd.), Kayakalan Yellow GL143 (Nippon Kayaku Co., Ltd.), Brilliant Indoblue (Hoechst), and Suminoil Yellow MR (Sumitomo Chemical Co., Ltd.). Examples of the blue dyes include Solofelterkis Blue BRL (Ciba-Geigy), Kayanol Milling Cyanine G (Nippon Kayaku Co., Ltd.) and Mitsui Acid Milling Sky Blue FSE (Mitsui Toatsu Chemicals, Inc.). Two or more dyes may be mixed to use (as two component-system dye). For dyeing the filter layer, 0.5 to 2 wt. % aqueous solution of the dye is acidified with acetic acid in an amount of 1 to 3 wt. %, to prepare a dye solution. The layer is dyed preferably while heated in a hot bath at 50 to 70° C. The time for dyeing is preferably in the range of 5 to 20 minutes.

Example 1

Preparation of Cellulose Acetate Film Used as the First Transparent Protective Film The following components were poured into a mixing tank, and stirred and heated to dissolve each component. Thus, a cellulose acetate solution was prepared.

| Cellulose acetate solution | |
|---|---|
| Cellulose acetate having acetic acid content of 60.9% (linter) | 80 weight parts |
| Cellulose acetate having acetic acid content of 60.8% (linter) | 20 weight parts |
| Triphenyl phosphate | 7.8 weight parts |
| Biphenyl diphenyl phosphate | 3.9 weight parts |
| Methylene chloride | 300 weight parts |
| Methanol | 45 weight parts |

Independently, 4 weight parts of cellulose acetate having acetic acid content of 60.9% (linter), 25 weight parts of the following retardation increasing agent, 0.5 weight part of silica fine particles (mean size: 20 nm), 80 weight parts of methylene chloride and 20 weight parts of methanol were poured into another mixing tank, and stirred and heated to prepare a retardation increasing agent solution.

(Retardation-Increasing Agent)

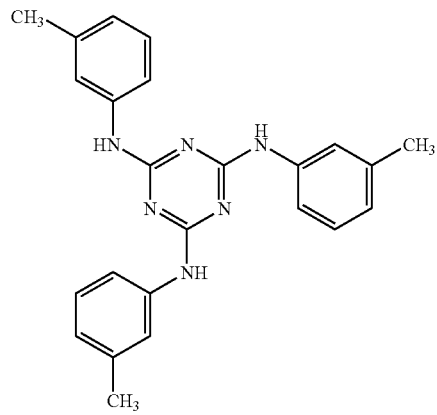

The cellulose acetate solution (470 weight parts) and the retardation-increasing agent solution (30 weight parts) were mixed and stirred well to prepare a dope. The prepared dope contained the retardation-increasing agent in the amount of 6.2 weight parts based on 100 weight parts of cellulose acetate.

The dope was cast on a band by means of a band-casting machine. After the surface temperature of the dope on the band reached at 35° C., the dope was dried for 1 minute. When the solvent remaining in the formed dope film reached 45 wt. %, the film was peeled from the band. The film was conveyed to a tenter-stretching zone, where it laterally stretched by 28% with a tenter at 140° C. The stretched film was then dried at 140° C. for 10 minutes, and further dried at 130° C. for 20 minutes. Thus, a cellulose acetate film (thickness: 60 μm) containing the remaining solvent in the amount of 0.3 wt. % was prepared.

The optical characters of the prepared cellulose acetate film were measured at the wavelength of 550 nm by means of an ellipsometer (M-150, JASCO CORPORATION), and thereby it was found that the Re and Rth values were 35 nm and 175 nm, respectively.

The surface of the prepared cellulose acetate film was coated with 5 ml/m² of 1.5 N potassium hydroxide solution (solvent: water/isopropyl alcohol/propylene glycol=14/86/15 volume %), kept at 60° C. for 10 seconds, washed with water to remove the potassium hydroxide, and dried. The surface energy of the thus-treated film was measured according to the contact angle method, to find 60 mN/m.

Thus, a cellulose acetate film used as the first transparent protective film was produced.

(Formation of Orientation Layer)

On the cellulose acetate film of the first transparent protective film, the following coating solution was applied in the amount of 28 ml/m² by means of a wire bar coater of #16. The applied solution was dried with hot air at 60° C. for 60 seconds, and then further dried with hot air at 90° C. for 150 seconds.

The formed layer was then subjected to rubbing treatment in which the rubbing direction was at the angle of 45° to the longitudinal direction of the cellulose acetate film, to form an orientation layer.

| Coating solution for orientation layer | |
|---|---|
| The following denatured polyvinyl alcohol | 10 weight parts |
| Water | 371 weight parts |
| Methanol | 119 weight parts |
| Glutaric aldehyde (cross-linking agent) | 0.5 weight part |

(Denatured polyvinyl alcohol)

—$(CH_2-CH)_{87.8}$— —$(CH_2-CH)_{0.2}$— —$(CH_2-CH)_{12.0}$—
 |                |                    |
 OH              O                    O
                 |                    |
                 CO                   CO
                                      |
                                      $CH_3$

O—$(CH_2)_4$—O—CO—CH=$CH_2$ (Formation of Optically Anisotropic Layer)

In 102 g of methyl ethyl ketone, 41.01 g of the following discotic liquid crystal compound, 4.06 g of ethylene oxide denatured trimethlolpropanetriacrylate (V#360, Osaka Organic Chemicals Co., Ltd.), 0.68 g of cellulose acetate butyrate (CAB-551-0.2, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved to prepare a coating solution. The coating solution was applied on the orientation layer by means of a wire bar coater of #4, and then heated in a thermostat zone at 130° C. for 2 minutes to orient the molecules of the discotic compound in hybrid alignment. The film was irradiated at 100° C. for 0.4 second with ultraviolet rays emitted from a high-pressure mercury lamp of 1200 W/cm, to polymerize and fix the molecules of the discotic compound. Thus, an optically anisotropic layer was formed.

The Re retardation value of the formed optically anisotropic layer was measured at 550 nm, to find 42 nm. The average angle (inclined angle) between the discotic planes and the cellulose acetate film surface was found 30°.

(Discotic Liquid Crystal Compound)

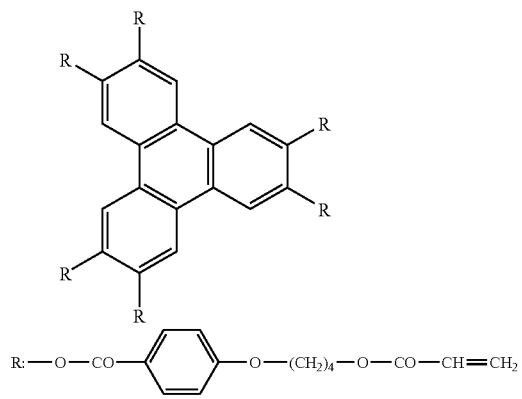

R: —O—CO—⟨phenyl⟩—O—$(CH_2)_4$—O—CO—CH=$CH_2$ (Preparation of Cellulose Acetate Film used as the Second Transparent Protective Film)

The following components were mixed to prepare cellulose acetate solutions used as dopes for forming inner and outer (surface) layers. Each solution was prepared according to the cooling dissolution method. In detail, the components were mixed to prepare each mixture composition, which was then left at room temperature for 3 hours to form an inhomogeneous gel solution. After cooled at −70° C. for 6 hours, the gel solution was heated to 50° C. and stirred to obtain each solution.

| Cellulose acetate solutions | for inner layer | for surface layer |
|---|---|---|
| Cellulose acetate (acetic acid content: 59.5%) | 100 weight parts | 100 weight parts |
| Triphenyl phosphate | 7.8 weight parts | 7.8 weight parts |
| Biphenyl diphenyl phosphate | 2.0 weight parts | 2.0 weight parts |
| Methyl acetate | 306 weight parts | 327 weight parts |
| Cyclohexanone | 122 weight parts | 131 weight parts |
| Methanol | 30.5 weight parts | 32.7 weight parts |
| Ethanol | 30.5 weight parts | 32.7 weight parts |
| Silica particles (mean size: 20 nm) | 1.0 weight part | 1.0 weight part |

The obtained dope for outer layer was filtered at 50° C. through a filter paper (absolute filtration precision: 0.0025 mm, FH025 PALL CORPORATION). The dope for inner layer was filtered at 50° C. through another filter paper (absolute filtration precision: 0.01 mm, #63 TOYO ROSHI KAISHA LTD.).

The dopes were cooperatively cast on a metal support from a three-layer co-casting die, so that the dope for inner layer might be sandwiched with the dope for outer layer and also so that the dry thickness of the inner and outer layers might be 48 μm and 6 μm, respectively. After stepwise dried on the support at 70° C. for 3 minutes and at 140° C. for 5 minutes, the formed film was peeled from the support. The peeled film was further dried at 130° C. for 30 minutes to evaporate the solvent. The amount of the solvent remaining in the film was 30 wt. % when the film was peeled from the support, while that was 0.9 wt. % when all the procedures were completed.

The peeled film was uniaxially stretched by 10% in the lateral direction by means of a tenter, and further uniaxially stretched by 15% in the longitudinal direction between rolls. The surfaces of the rolls for stretching were beforehand polished to be mirrors. Heated oil was circulated to control the temperature of the rolls at 135° C. while the film was stretched. After stretched, the film was dried and wound up at 130° C. for 30 minutes. The thickness of the resultant film was 50 μm.

The surface roughness (Ra) of the film per 100 mm was measured at ten points randomly selected in the lateral direction, to find 0.09 μm on average.

Thus, the cellulose acetate film used as the second transparent protective film was produced.

(Formation of Light-Diffusing Layer)

A mixture of 13.8 weight parts of ultraviolet curable resin (DPHA, Nippon Kayaku Co., Ltd.; refractive index: 1.51), 42.0 weight parts of ultraviolet curable resin (KZ-7114A, JSR Co., Ltd.; refractive index: 1.68), 7.7 weight parts of methyl iso-butyl ketone containing cross-linked polystyrene beads (SXS-350H, Soken Kagaku Co., Ltd.; particles size: 3.5 μm; refractive index: 1.61) dispersed in the amount of 30 wt. %, and 20 weight parts of methyl ethyl ketone containing silica fine particles (MXS-150CF, Nippon Shoukubai Co., Ltd.) dispersed in the amount of 30 wt. % was prepared. To the mixture, 10.0 weight parts of methyl ethyl ketone and 1.9 weight parts of methyl iso-butyl ketone were added to prepare a coating solution.

The prepared coating solution was applied on the cellulose acetate film of the second transparent protective film in the amount of 8.6 ml/m². The coating layer was dried, and then exposed to ultraviolet light (illuminance: 140 mW/cm², exposure: 300 mJ/cm²) emitted from an air-cooled metal halide lamp of 160 W/cm (Eyegraphics Co., Ltd.) to harden the layer.

Thus, a light-diffusing layer was prepared.

The haze of the second transparent protective film on which the diffusing layer was provided was determined by means of a measuring apparatus (HR-100, Murakami Shikisai Gijutsu-kenkyujo Co., Ltd,) according to JIS-K-7105, to be found 56%.

(Production of Viewer-Side Polarizing Plate for OCB Mode)

Iodine was adsorbed on a stretched polyvinyl alcohol film to prepare a polarizing membrane.

The second transparent protective film (on which the diffusing layer was provided) was saponified and laminated on one surface of the polarizing membrane with polyvinyl alcohol adhesive, so that the second transparent protective film (cellulose acetate film) might be contact with the membrane.

The first transparent protective film (on which the optically anisotropic layer was provided) was laminated on the other surface of the membrane with polyvinyl alcohol adhesive, so that the first transparent protective film (cellulose acetate film) might be contact with the membrane. The first protective film was placed so that the slow axis of the film might be parallel to the transmission axis of the polarizing membrane.

Thus, a viewer-side polarizing plate for OCB mode was produced.

(Production of Backlight-Side Polarizing Plate)

Iodine was adsorbed on a stretched polyvinyl alcohol film to prepare a polarizing membrane.

The first transparent protective film (on which the optically anisotropic layer was provided) was laminated on one surface of the membrane with polyvinyl alcohol adhesive, so that the first transparent protective film (cellulose acetate film) might be contact with the membrane. The first protective film was placed so that the slow axis of the film might be parallel to the transmission axis of the polarizing membrane.

A commercially available cellulose triacetate film (Fujitac TD80, Fuji Photo Film Co., Ltd.) was saponified and laminated on the other surface of the polarizing membrane.

Thus, a backlight-side polarizing plate was produced.

(Production of Liquid Crystal Display of OCB Mode)

On a glass plate provided with an ITO electrode, a polyimide layer was formed and the surface of the layer was subjected to rubbing treatment to form an orientation layer. Further, another glass substrate having orientation layer was prepared in the same manner. The thus-prepared two glass plates were faced to each other so that the rubbing directions were parallel to each other, and combined so that the gap between the plates might be 6 μm. A commercially available liquid crystal compound (Δn=0.1396; trade name: ZLI1132, Merck & Co., Inc.) was inserted into the gap, to prepare a liquid crystal cell of OCB mode.

On one side of the prepared liquid crystal cell, the viewer-side polarizing plate was laminated. On the other side, the backlight-side polarizing plate was laminated. The viewer-side polarizing plate was placed so that the optically anisotropic layer might be contact with the cell and so that the rubbing direction of the anisotropic layer might be anti-parallel to that of the liquid crystal cell. On the backlight-side polarizing plate, a backlight unit was provided.

Voltage of a square wave (55 Hz) was applied to the liquid crystal cell. An image was displayed according to normally white mode (white: 2V, black: 5V). A ratio of contrast (white/black) was measured by means of a meter (EZ-Contrast 160D, ELDIM) at eight displaying states of L1 (full black) to L8 (full white).

The viewing angle was evaluated as an angle range giving a contrast ratio of 10 or more without reversing black tones (between L1 and L2). As a result, it was found that the angle was 80° in each of the upward, downward and right-leftward directions.

Example 2

Production of Viewer-Side Polarizing Plate for VA Mode

Iodine was adsorbed on a stretched polyvinyl alcohol film to prepare a polarizing membrane.

The second transparent protective film (on which the diffusing layer was provided in Example 1) was saponified and laminated on one surface of the polarizing membrane with polyvinyl alcohol adhesive, so that the second transparent protective film (cellulose acetate film) might be contact with the membrane.

The first transparent protective film prepared in Example 1 was laminated on the other surface of the membrane with polyvinyl alcohol adhesive, so that the slow axis of the film might be parallel to the transmission axis of the polarizing membrane.

Thus, a viewer-side polarizing plate for VA mode was produced.

(Production of Backlight-Side Polarizing Plate)

Iodine was adsorbed on a stretched polyvinyl alcohol film to prepare a polarizing membrane.

The first transparent protective film produced in Example 1 was laminated on one surface of the membrane with polyvinyl alcohol adhesive, so that the slow axis of the film might be parallel to the transmission axis of the polarizing membrane.

A commercially available cellulose triacetate film (Fujitac TD80, Fuji Photo Film Co., Ltd.) was saponified and laminated on the other surface of the polarizing membrane.

Thus, a backlight-side polarizing plate was produced.

(Production of Liquid Crystal Display of VA Mode)

A pair of polarizing plates and a pair of optical compensatory sheets were removed from a commercially available liquid crystal display of VA mode (VL-1530S, Fujitsu, Ltd.). In place of the removed members, the above-prepared viewer-side and backlight-side polarizing plates were laminated with an adhesive on the viewer-side and backlight-side of the cell, respectively. The viewer-side polarizing plate was placed so that the first transparent protective film might be on the liquid crystal cell side and so that the transmission axis might be in the up-down direction. The backlight-side polarizing plate was placed so that the transmission axis might be in the left-right direction. Thus, the polarizing plates were arranged in cross-Nicol position.

In the thus-assembled composition, the distance between the color filter and the light-diffusing layer was 0.59 mm.

The viewing angle of the prepared liquid crystal display was measured by means of a measuring apparatus (EZ-Contrast 160D, ELDIM) when each of eight tones of black (L1) to white (L8) was displayed.

As a result, the angle range giving a contrast ratio of 10 or more is more than 80° along the transmission axis and also at the angle of 45° to the transmission axis.

The angle giving bright tones (L7, L8) seen at 200 (right-leftward), namely the range giving preferred tone characters, was 50° at the angles of 51° and 45° to the transmission axis.

According to the invention, the polarizing plate improves qualities of images displayed by liquid crystal displays of OCB and VA mode. In particular, it improves (enlarges) the image qualities (particularly, downward viewing angles) of wide-viewing liquid crystal displays. The viewing angles (particularly, downward viewing angles) are so enlarged that the image contrast is hardly lowered, that the tone or black-white inversion is prevented, and that the hue is hardly changed.

The invention claimed is:

1. A liquid crystal display of OCB mode which comprises a backlight unit, a backlight-side polarizing plate, a liquid crystal cell of OCB mode and a viewer-side polarizing plate in order, wherein the viewer-side polarizing plate comprises an optically anisotropic layer formed from liquid crystal compound, a first transparent protective film, a polarizing membrane, a second transparent protective film and a light-diffusing layer in order, said viewer-side polarizing plate being so placed that the optically anisotropic layer formed from liquid crystal compound is arranged on a side of the liquid crystal cell, wherein the first transparent protective film is a cellulose acetate film having a Re retardation value of 20 to 70 nm and a Rth retardation value of 100 to 500 nm, wherein the light-diffusing layer comprises transparent resin and transparent fine particles dispersed therein, said transparent resin and said transparent fine particles having refractive indices that are different from each other, and wherein the liquid crystal cell of OCB mode comprises a color filter, and a distance between the color filter and the light-diffusing layer of the viewer-side polarizing plate is 0.6 mm or less.

2. The liquid crystal display as defined in claim 1, wherein the first transparent protective film is a cellulose acetate film having a thickness of 10 to 70 μm, and comprising cellulose acetate having an acetic acid content of 59.0 to 61.5%.

3. The liquid crystal display as defined in claim 1, wherein the first transparent protective film is a cellulose acetate film comprising 100 weight parts of cellulose acetate and 0.01 to 20 weight parts of an aromatic compound having at least two aromatic rings.

4. The liquid crystal display as defined in claim 1, wherein the second transparent protective film is a cellulose acetate film having a thickness of 10 to 70 μm, and comprising cellulose acetate having an acetic acid content of 59.0 to 61.5%.

5. The liquid crystal display as defined in claim 1, wherein the second transparent protective film has, on a side of the light-diffusing layer, a surface on which average surface roughness measured at a cut-off value of 0.8 mm per 100 mm length is 0.2 μm or less.

6. The liquid crystal display as defined in claim 1, wherein the liquid crystal compound is a discotic liquid crystal compound.

7. The liquid crystal display as defined in claim 1, wherein the difference between the refractive index of the transparent resin and the refractive index of the transparent fine particles is in the range of 0.02 to 0.15.

8. The liquid crystal display as defined in claim 1, wherein the transparent fine particles have a size distribution having at least two peaks, one of which is in the range of 0.5 to 2.0 μm and another of which is in the range of 2.0 to 5.0 μm.

9. The liquid crystal display as defined in claim 1, wherein the light-diffusing layer has a haze of 40% or more.

10. The liquid crystal display as defined in claim 1, wherein a low-refractive index layer having a refractive index of 1.35 to 1.45 is provided on the light-diffusing layer.

11. A liquid crystal display of OCB mode which comprises a backlight unit, a backlight-side polarizing plate, a liquid crystal cell of OCB mode and a viewer-side polarizing plate in order, wherein the viewer-side polarizing plate comprises an optically anisotropic layer formed from liquid crystal compound, a first transparent protective film, a polarizing membrane, a second transparent protective film and a light-diffusing layer in order, said viewer-side polarizing plate being so placed that the optically anisotropic layer formed from liquid crystal compound is arranged on a side of the liquid crystal cell, wherein the first transparent protective film is a cellulose acetate film having a Re retardation value of 20 to 70 nm and a Rth retardation value of 100 to 500 nm, wherein the light-diffusing layer comprises transparent resin and transparent fine particles dispersed therein, said transparent resin and said transparent fine particles having refractive indices that are different from each other, wherein the liquid crystal cell of OCB mode comprises a backlight-side substrate, a liquid crystal layer and a viewer-side substrate in order, wherein a color filter is placed between the liquid crystal layer and the viewer-side substrate, and wherein a total thickness of the viewer-side substrate, the optically anisotropic layer of the viewer-side polarizing plate, the first transparent protective film of the viewer-side polarizing plate, the polarizing membrane of the viewer-side polarizing plate and the second transparent protective film of the viewer-side polarizing plate is 0.6 mm or less.

* * * * *